(12) United States Patent
Carr et al.

(10) Patent No.: US 7,173,764 B2
(45) Date of Patent: Feb. 6, 2007

(54) APPARATUS COMPRISING A TUNABLE NANOMECHANICAL NEAR-FIELD GRATING AND METHOD FOR CONTROLLING FAR-FIELD EMISSION

(75) Inventors: Dustin Wade Carr, Albuquerque, NM (US); Gregory Robert Bogart, Corrales, NM (US)

(73) Assignee: Sandia Corporation, Albuquerque, NM (US)

( * ) Notice: Subject to any disclaimer, the term of this patent is extended or adjusted under 35 U.S.C. 154(b) by 160 days.

(21) Appl. No.: 10/829,782

(22) Filed: Apr. 22, 2004

(65) Prior Publication Data

US 2005/0237617 A1  Oct. 27, 2005

(51) Int. Cl.
*G02B 5/18* (2006.01)
(52) U.S. Cl. .................. 359/569; 359/566; 359/573; 359/291
(58) Field of Classification Search ............... 359/566, 359/568, 569, 573, 575, 291
See application file for complete search history.

(56) References Cited

U.S. PATENT DOCUMENTS

| | | | |
|---|---|---|---|
| 5,351,256 A | 9/1994 | Schneider et al. | |
| 5,428,634 A | 6/1995 | Bryan et al. | |
| 5,493,577 A | 2/1996 | Choquette et al. | |
| 5,557,627 A | 9/1996 | Schneider et al. | |
| 5,568,499 A | 10/1996 | Lear et al. | |
| 5,633,527 A | 5/1997 | Lear et al. | |
| 5,903,590 A | 5/1999 | Hadley et al. | |
| 5,978,401 A | 11/1999 | Morgan et al. | |
| 6,515,751 B1 | 2/2003 | Craighead et al. | |
| 6,628,851 B1 | 9/2003 | Rumpf et al. | |
| 6,894,836 B2* | 5/2005 | Christenson | 359/563 |
| 2003/0128361 A1* | 7/2003 | Kuroda et al. | 356/400 |

OTHER PUBLICATIONS

Solgaard, et al, Deformable Grating Optical Modular, Optics Letters, vol. 1, No. 9, May 1, 1992, E. L. Ginzton Lab, Stanford Univ, Stanford, CA 9305.
Chen, et al, A Thick Polysilicon Surface Micromachined Optically Sensed Accelerometer, Part of the SPIE Conf on Silicon-based Optoelectronics, San Jose, CA, Jan. 1999.
Carr, et al, Laterally Deformable Nanomechanical Zeroth-Order Gratings: Anamalous Diffraction Studied by Rigorous Coupled-Wave Analysis, Optics Letters, vol. 28, No. 18, Sep. 15, 2003.
Carr, et al, Measurement of a Laterally Deformable Optical NEMS Grating Transducer, Proceedings of SPIE vol. 5346 (SPIE, Bellingham, WA, 2004).

* cited by examiner

*Primary Examiner*—Leonidas Boutsikaris
(74) *Attorney, Agent, or Firm*—John P. Hohimen (57) ABSTRACT

A tunable nanomechanical near-field grating is disclosed which is capable of varying the intensity of a diffraction mode of an optical output signal. The tunable nanomechanical near-field grating includes two sub-gratings each having line-elements with width and thickness less than the operating wavelength of light with which the grating interacts. Lateral apertures in the two sub-gratings are formed from the space between one line-element of the first sub-grating and at least one line-element of the second sub-grating. One of the sub-gratings is capable of motion such that at least one of aperture width and aperture depth changes, causing a perturbation to the near-field intensity distribution of the tunable nanomechanical near-field grating and a corresponding change to the far-field emission of thereof.

28 Claims, 10 Drawing Sheets

APPARATUS COMPRISING A TUNABLE NANOMECHANICAL NEAR-FIELD GRATING AND METHOD FOR CONTROLLING FAR-FIELD EMISSION

FIELD OF THE INVENTION

The present invention relates to optics in general, and, more particularly, to tunable diffraction gratings.

BACKGROUND OF THE INVENTION

As light travels through a uniform material, such as air, it behaves as a series of plane waves traveling in the direction of propagation. When a plane wave meets an obstruction, it undergoes a change due to interaction with that obstruction. Every unobstructed point on the wavefront of the wave can be considered as a source of a secondary spherical wavelet with the same wavelength and phase as the incident wave. The outgoing wavefront is the combination of all of these wavelets.

For example, if a plane wave that is traveling through water strikes a barrier that has a single small aperture (i.e., no wider than the wavelength), the outgoing wave takes a form similar to the wavefront that would be generated if a pebble were dropped into the water at the aperture. The incident plane wave is said to diffract outwardly from the aperture in a circular pattern. If the barrier contains an aperture that is larger than the wavelength, the wavefront that emerges from the aperture takes a form similar to the wavefront that would be generated if a continuous series of pebbles were dropped in a line in the aperture. As a result, the portion of the incoming wave that is incident upon the aperture appears to pass through substantially unaltered, while the remainder is blocked by the barrier. At the edges of the emerging wave, some diffraction is evident.

Two major regions surround the aperture; a near-field region and a far-field region. The near-field region is the region within one wavelength of the aperture and the far-field region is the region beyond the distance of one wavelength. The form of a wavefront that emerges from an aperture depends upon whether the point of observation is in the near-field region or far-field region. In the near-field region, the aperture is nearly perfectly imaged showing only minor fringes at the edges due to diffraction. As the point of observation is moved beyond one wavelength from the aperture, the fringes becomes more significant. In the far-field, the image of the aperture is diffraction limited. In other words, diffraction increases fringing in the image of the aperture to such an extent that the aperture is no longer perfectly imaged.

In a case in which the barrier contains multiple apertures, the waves that emerge from each aperture interact with one another in the far-field region. These emerging waves undergo constructive and destructive interference based on their relative phases. For example, if the peak of a wave from a first aperture meets a valley of a wave from a second aperture, the two waves will cancel each other out (i.e., destructive interference). No sign of a wave will be apparent at that point. If, however, the peak of the first wave coincides with a peak of the second wave, they will combine constructively resulting in one relatively larger wave at that point. This behavior—destructive and constructive interference—forms the basis for a diffraction grating, which is a repetitive array of objects, either apertures or opaque obstructions, which produce periodic changes to the phase and/or amplitude of an optical wave that emerges from the grating.

There are a variety of different types of fixed diffraction gratings. One type is the one-dimensional (linear) Bragg diffraction. This grating resembles a comb, wherein there is a fixed, uniform spacing between the teeth. This uniform spacing, as well as the width and depth of the teeth, determine the output characteristics of the grating. The linear Bragg grating is designed to diffract light having a specific wavelength into modes that emerge along multiple discrete angles. That specific wavelength is defined to be the "operating wavelength" of the grating. The light that emerges from the grating without deviation from the incident angle is defined to be in the zeroth-order mode. In a transmissive grating, light emerges at the opposite side of the grating from which it entered while in a reflective grating, light emerges from the same side of the grating. The angle of each of the higher-order modes, and the amount of light in each mode, depends on the design of the grating and the wavelength of the incident light.

In contrast to fixed diffraction gratings, tunable diffraction gratings have been developed wherein the spacing between elements can be varied in order to change the performance of the grating and enable operation over a range of wavelengths. Tunable diffraction gratings are able to:

change the distribution of light that emerges in the zeroth and higher-order modes;

change the angles at which the higher-order modes emerge; and change the wavelength of operation for the grating.

One example of a tunable diffraction grating is the laterally-deformable first-order grating. In this type of grating, the grating pitch of a single-plane of uniformly-spaced grating elements is mechanically changed through "accordion-like" expansion or compression of the entire grating. Expansion and compression have been applied through various means including mechanical actuators such as piezoelectric elements, MEMS lateral actuators, electromagnetic actuators, and thermal actuators. Unfortunately, laterally-deformable gratings have suffered from non-uniform compression due to mechanical irregularities as well as poor reliability due to large induced strains in the grating materials.

A second type of tunable grating is the vertically-deformable first-order grating. One example of this type of grating is disclosed by Solgaard et al. in "Deformable Grating Light Valve," *Optics Letters*, v(17) 1992 (hereinafter referred to as "the Solgaard device"). These gratings comprise two "half-gratings," each of which has a linear array of grating elements. Each half-grating has a 50% fill-factor and the same half-grating pitch (i.e., the repeat distance of the grating elements in the half-grating). The top grating is laterally shifted by one-half of the half-grating pitch, such that the structure appears to be a continuous sheet of material when viewed from above. In its undeflected state, the respective top surfaces of the two half-gratings are separated by a multiple of one-half of the wavelength of incident light. As a consequence, incident light substantially entirely reflects from the structure (i.e., the outgoing light is in the zeroth-order mode). When the vertical distance that separates the two top surfaces is changed by an amount equal to one-quarter of the incident wavelength, the optical energy is substantially completely diffracted into the negative and positive higher-order modes.

In its deflected state, the Solgaard device operates on the far-field of the emerging light in the same manner as a conventional diffraction grating. Specifically, in the far field, reflected wavelets from each grating element combine constructively and destructively as a function of the relative phase of the multiple wavelet components at each point in space.

In its undeflected state, the Solgaard device approximates a mirror surface due to the 360° phase difference (i.e., one complete wavelength) between the two half-gratings. Light having the same wavelength emanating from two points that are separated by an integer multiple of a wavelength reinforce each other (i.e., combine constructively).

Laterally-deformable diffraction gratings based on MEMS are also known, such as the MEMS reconfigurable optical grating described by Rumpf et al., in U.S. Pat. No. 6,628,851. Rumpf describes a conventional diffraction grating wherein each line-element is attached to an individual lateral actuator in order to enable reconfigurability within the plane containing the conventional line-elements.

The range of motion required for known laterally-deformable or vertically-deformable tunable diffraction gratings is a significant fraction of the operating wavelength of the grating. As a consequence, the speed of response (i.e., operating bandwidth) and reliability of these tunable diffraction gratings are limited by mechanical considerations, such as the size and mass of the line-elements and the amount of induced strain that is required to affect a desired change in operating characteristic.

SUMMARY OF THE INVENTION

The illustrative embodiment of the present invention is a tunable nanomechanical near-field grating and method for causing changes in the far-field emission of the grating in response to very small changes in element spacing within the near-field of the grating.

In a first illustrative embodiment, a tunable nanomechanical near-field grating comprises a first and second sub-grating. Each sub-grating includes line-elements having a width and a thickness that is less than the operating wavelength of the grating. A plurality of apertures is collectively formed by the two sub-gratings, each aperture having an aperture width and aperture depth. Aperture width is defined as the lateral distance between one line-element of the first sub-grating and one line-element of the second sub-grating. Aperture depth is defined as the vertical distance between the bottom of a line-element of the bottom-most sub-grating and the top of a line-element of the top-most sub-grating. One of the first or second sub-gratings is capable of motion such that the aperture width and/or aperture depth is variable. Changing the aperture width and/or aperture depth perturbs the near-field intensity distribution of the tunable nanomechanical grating, with a corresponding change to its far-field emission.

In another embodiment, a telecommunications network element comprises a tunable nanomechanical near-field grating, optical waveguides, and optical elements. In some embodiments, the telecommunications network element is connected to an optical communications network and provides a desired function such as an on/off switch, variable optical attenuator, selective wavelength channel blocker, equalizer, channel selector, or wavelength add/drop switch.

In another embodiment, a two-dimensional array of tunable nanomechanical near-field gratings provides the active elements in a focal plane array for a tunable imaging system.

In another embodiment, a tunable nanomechanical near-field grating is used as a sensor that senses a change to an environmental factor such as acceleration, shock, vibration, temperature, gravity, incident radiation, or concentration of a chemical species.

DETAILED DESCRIPTION

Figure 1:
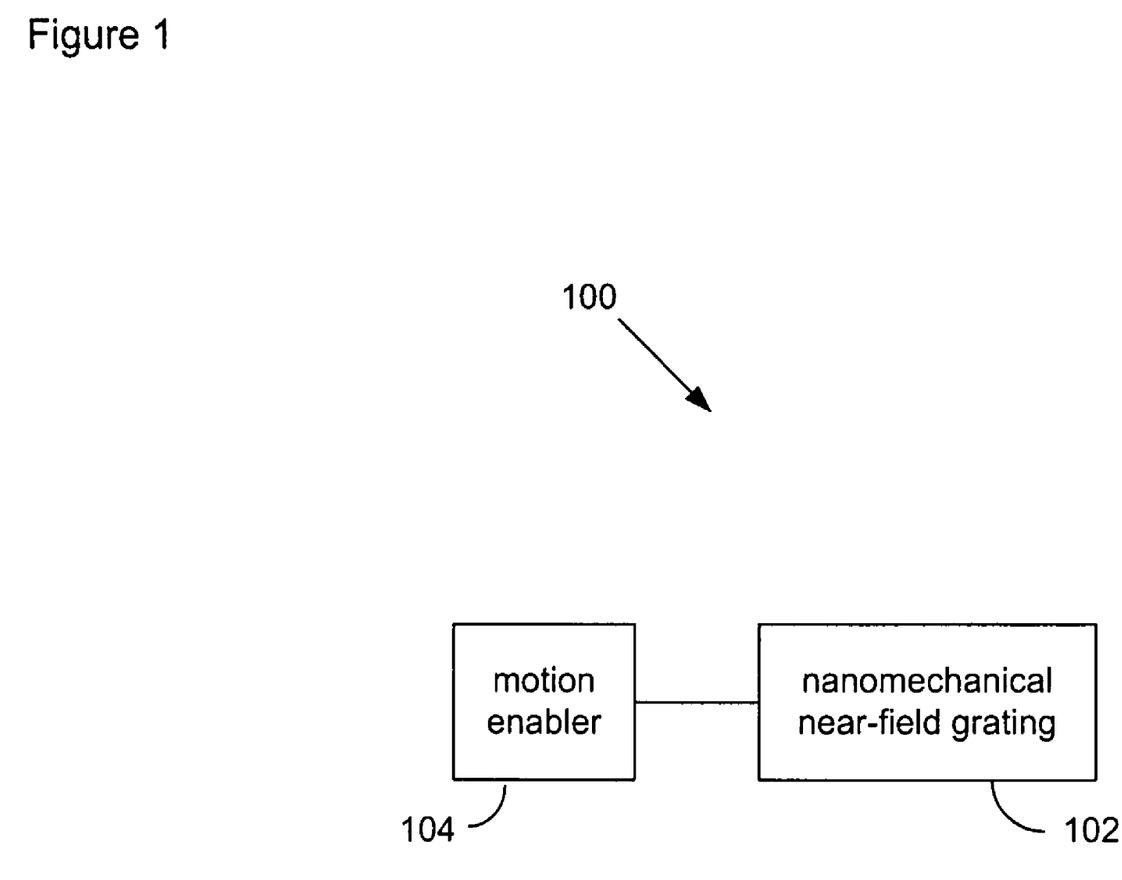
FIG. 1 depicts a schematic view of a tunable nanomechanical near-field grating in accordance with the illustrative embodiment of the present invention.

FIG. 1 depicts a schematic view of a tunable nanomechanical near-field grating in accordance with the illustrative embodiment. As used in this specification, the phrase "nanomechanical near-field grating" is defined as a grating comprising line-elements that have width and thickness less than one micron, and wherein at least some of the line-elements are separated by a distance less than the operating wavelength of the grating.

Figure 2:
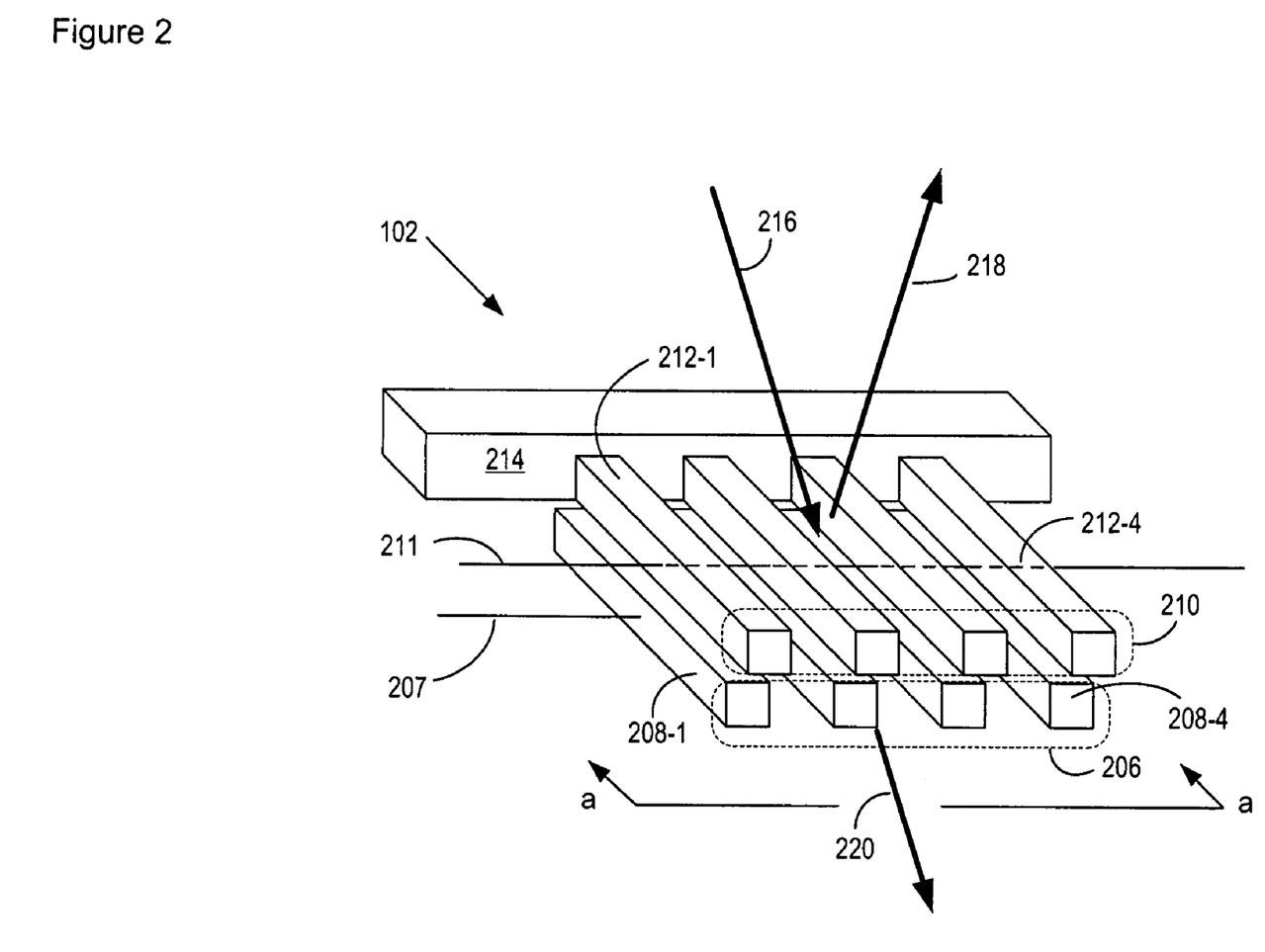
FIG. 2 depicts a perspective view of a tunable nanomechanical near-field grating in accordance with the illustrative embodiment.

Tunable nanomechanical near-field grating 100 comprises nanomechanical near-field grating 102 (hereinafter, "grating") and motion enabler 104. As depicted in FIG. 2, grating 102 comprises sub-gratings 206 and 208. Sub-grating 206 includes line elements 208-$i$, i=1,4 (collectively, line-elements 208), which are spaced uniformly along lateral axis 207. Sub-grating 210 includes line-elements 212-$i$, i=1,4, (collectively, line-elements 212), which are spaced uniformly along lateral axis 211. Line-elements 212 depend from beam 214. Each line-element 208-$i$ is in the near-field region of the nearest line-element 210-$i$. Motion enabler 104 permits movement of line-elements 210 within the near-field of line-elements 208 and thereby perturbs the near-field intensity distribution of grating 102. In some embodiments, motion enabler 104 simply permits movement of line-elements 210 in response to a change in an environmental factor (e.g., acceleration, temperature, etc.). In other embodiments, motion enabler 104 pro-actively moves line-elements 210 in response to a control signal (in these embodiments, motion enabler 104 comprises an actuator).

As previously noted, there are two regions of observation for light interacting with obstacles and apertures (such as grating 102): the near-field region (within one operating wavelength) and the far-field region (beyond one operating wavelength). The optical-field intensity distribution in the near-field region of grating 102 behaves quite differently than that in the far-field region, in that light observed in the near-field region does not exhibit the diffraction effects that are observed in the far-field region. But the far-field emission pattern of grating 102 is a function of its near-field intensity distribution. As a consequence, perturbations to the near-field intensity distribution are observed as changes to the far-field emission pattern.

With continuing reference to FIG. 2, behavior in the near-field region can be characterized by analysis of the interaction of line-elements 208 and 212 and incident light 216. Each line-element 208-$i$ and 212-$i$ comprises an electron-oscillator that vibrates and reemits light at the wavelength of incident light 216. The mutual interaction of electron-oscillators that are associated with two line-elements rapidly decreases as the separation of the line-elements increases. The interaction reaches an inconsequential level at a distance substantially equal to the wavelength of incident light 216 (i.e., the operating wavelength of the grating).

The characteristics of reflected output signal 218 and transmitted output signal 220 are dependent upon the near-field intensity distribution of grating 102. Therefore, even slight motion of line-elements 212 with respect to line-elements 208 directly affects output signals 218 and 220. In particular, the distribution of optical intensity among the various diffraction orders composing output signals 218 and 220 changes as sub-grating 210 moves with respect to sub-grating 206.

Tunable nanomechanical near-field grating 100 operates either as an active grating or a passive grating as a function of the manner in which the relative position of sub-gratings 206 and 210 changes. As used herein, the term "active grating," when used to describe tunable nanomechanical near-field grating 100, means that the relative position of sub-gratings 206 and 210 is pro-actively controlled (typically to control the intensity of a diffractive mode of either output signals 218 or 220). As used herein, the term "passive grating," when used to describe tunable nanomechanical near-field grating 100, means that the relative position of sub-gratings 206 and 210 is not pro-actively controlled. In some embodiments in which tunable nanomechanical near-field grating 100 is implemented as a passive grating, the intensity of a diffraction mode of either output signal 218 or 220 is monitored in order to detect a change in the relative position of the sub-gratings (typically due to the impact of an environmental factor, such as temperature, acceleration, etc.). One example of tunable nanomechanical near-field grating 100 implemented as a passive grating is a sensor, such as, without limitation, an accelerometer, shock or vibration sensor, gravity sensor, radiation sensor, temperature sensor, or chemical sensor.

Figure 3A:
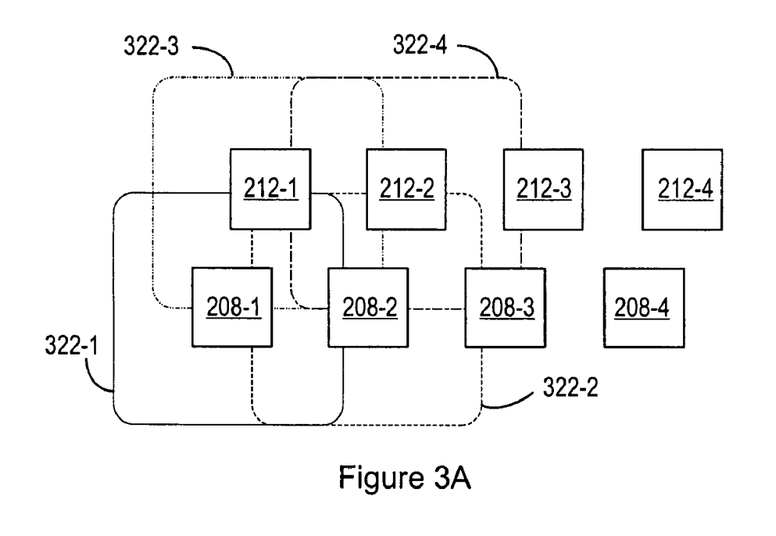
FIGS. 3A and 3B depict side views of the features along axes 207 and 211, as seen in view a—a of FIG. 2, in accordance with the illustrative embodiment of the present invention.

FIG. 3A is a side view of grating 102 of FIG. 2 in the direction indicated, with beam 214 omitted for clarity. As depicted in FIG. 3A, each of line-elements 208-$i$ is located within the near-field region of at least one line-element 210, and vice-versa. For example, line-element 212-1 is within near-field region 322-1 of line-element 208-1, and line-element 208-1 is within near-field region 322-3 of line-element 212-1. For clarity, not all near-field regions associated with line-elements are shown.

Figure 3B:
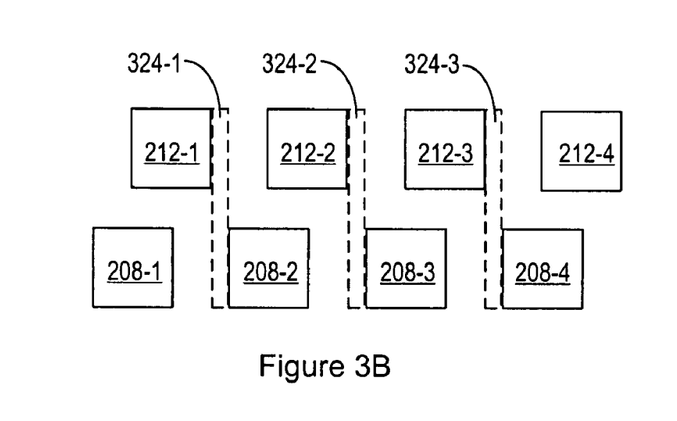

As depicted in FIG. 3B, grating 102 comprises apertures 324-1 through 324-3 (collectively, apertures 324). Each aperture has an aperture width and an aperture depth, which are defined by the lateral and vertical spaces, respectively, between one of line-elements 208 and one of line-elements 212. For example, aperture 324-1 has an aperture width defined by the lateral space between line-elements 212-1 and 208-2 and an aperture depth defined by the vertical space between the top of line-element 212-1 and the bottom of line-element 208-2.

Since the far-field behavior of grating 102 is a function of its near-field intensity distribution, a nanometer-scale change to the aperture width or aperture depth of apertures 324 results in a significant change to output signals 218 and 220. For example, lateral motion of less than 50 nanometers results in an appreciable change of the zeroth-order-mode output intensity of output signals 218 and 220. As a result of this small motion requirement, tunable nanomechanical near-field grating 100 is capable of high-speed behavior that has been hitherto difficult to attain. In addition, when used as a sensor, tunable nanomechanical near-field grating 100 provides a sensitivity to outside influences that is typically much greater than prior-art devices.

Although grating 102 is a Bragg grating in the illustrative embodiment, in other embodiments, grating 102 is a tunable chirped grating, a tunable distributed Bragg grating, and other types of gratings.

Figure 4A:
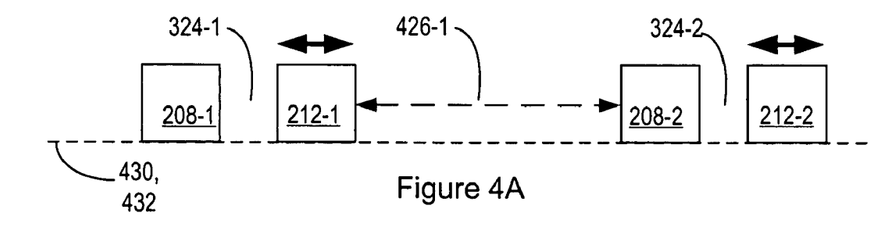
FIGS. 4A through 4C depict side views of alternative arrangements of the features along axes 207 and 211, as seen in view a—a of FIG. 2, in accordance with the illustrative embodiment of the present invention.
Figure 4B:
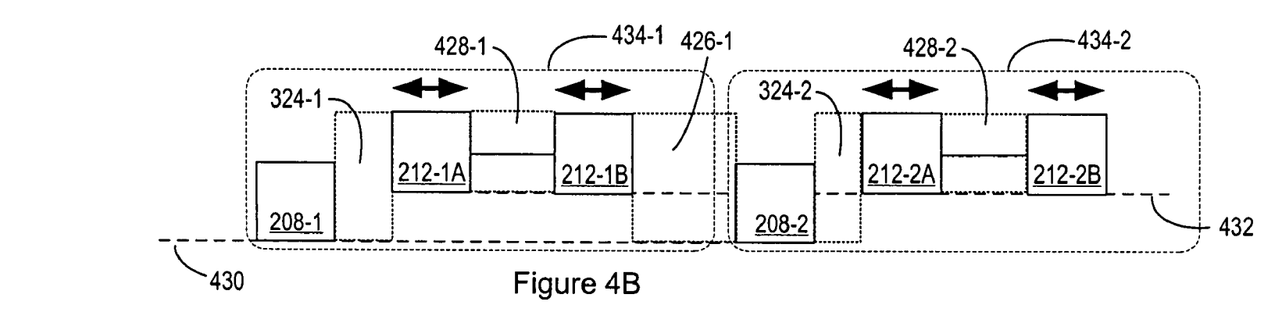
Figure 4C:
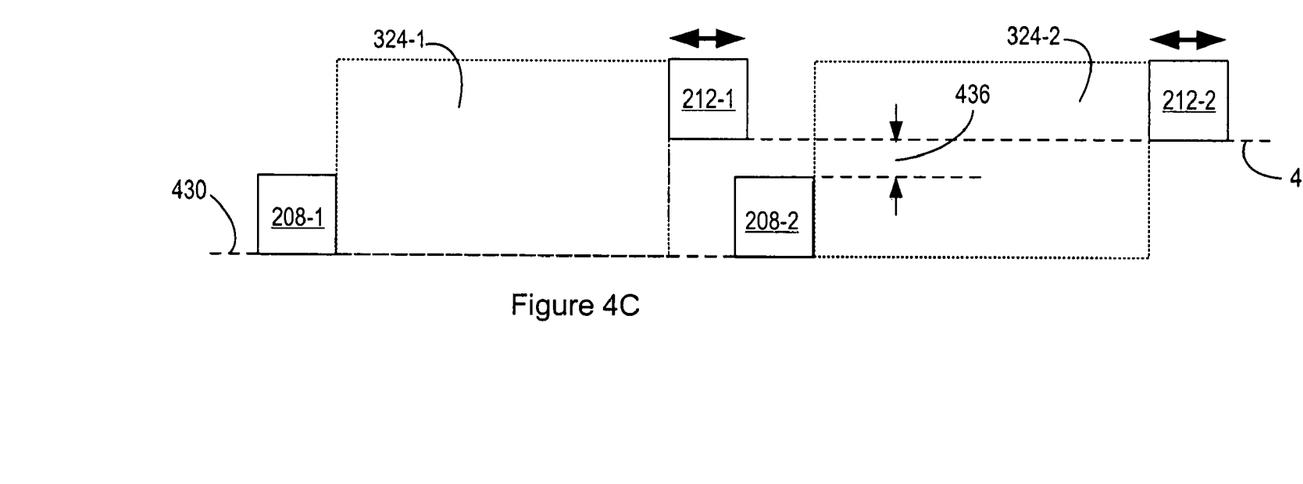

An important characteristic of grating 102 is the close proximity of a line element (e.g., line-element 212-1) from sub-grating 210 and a line-element (e.g., line-element 208-2) from sub-grating 206. In accordance with the illustrative embodiment, nearest-neighbor line-elements, one from each sub-grating, are spaced apart by no more than one operating wavelength. FIGS. 4A, 4B, and 4C depict side views of alternative arrangements of the line-elements 208 and 212. In each of the three arrangements shown, line-elements 208 lie on plane 430 and line-elements 212 lie on plane 432. Planes 430 and 432 extend "into the page."

The line-elements depicted in FIG. 4A through 4C are supported in the same manner as is depicted in FIG. 2. That is, line-elements 212 compose sub-grating 210. Line-elements 212 are rigidly coupled to beam 214 on a fixed repeat period along axis 211. Beam 214 is not depicted in FIGS. 4A through 4C to improve clarity. In some embodiments, the repeat period is less than or equal to the operating wavelength, while in other embodiments the repeat period is greater than the operating wavelength. Line-elements 208, which are arrayed along axis 207, compose sub-grating 206. Sub-grating 206 has substantially the same fixed repeat period as that of sub-grating 210.

In FIG. 4A, plane 430 and plane 432 are coincident and, as a result, line-elements 208 and 212 are substantially co-planar. For a grating having a planar arrangement such as that shown in FIG. 4A, perturbation of the near-field intensity distribution is substantially limited to that achieved through lateral movement of one of sub-gratings 206 and 210.

As depicted in FIG. 4B, line-elements 212 collectively form a plurality of unit-cells 434-$i$, $i=1,n$, two of which are shown. Each unit-cell 434-$i$ contains two line-elements. For example, unit-cell 434-1 contains line-elements 212-1A and 212-1B. In embodiments such as that shown in FIG. 4B, fixed aperture 428-$i$, $i=1,n$, and second non-fixed apertures 426-*i*, i=1,n, are formed in addition to apertures 324-*i*. Alternative arrangements are shown in FIGS. 4A and 4C, wherein each unit cell contains one line-element 212-*i*.

In FIG. 4B, planes 430 and 432 are separated by a vertical distance less than the thickness of line-elements 208, and as a result line-elements 208 and 212 overlap vertically, but are not co-planar.

FIG. 4B depicts an embodiment comprising unit-cells that each include one independently variable aperture. It will be clear to those skilled in the art, however, after reading this specification, how to make and use embodiments of the present invention wherein each unit-cell includes a plurality of independently variable apertures. Furthermore, it will be clear to those skilled in the art how to make and use alternative embodiments of the present invention wherein each unit-cell includes a plurality of line-elements, such that each is capable of movement that is independent from any other line-element included in said unit-cell.

In FIG. 4C, planes 430 and 432 are separated by a vertical distance greater than the thickness of line-elements 208, but vertical separation 436 between the top of line-elements 208 and the bottom of line-elements 212 is less than or equal to the operating wavelength. For a grating having an arrangement of line-elements as shown in FIGS. 4B and 4C, perturbation of the near-field intensity distribution can be accomplished through lateral and/or vertical movement of one of sub-gratings 206 and 210.

Each of FIGS. 4A through 4C depict arrangements that have one movable sub-grating and one fixed sub-grating. It will be clear to those skilled in the art, however, after reading this specification, how to make and use embodiments of the present invention that comprise more than one independently-movable sub-grating. Furthermore, it will be clear to those skilled in the art how to make and use alternative embodiments of the present invention that include at least three sub-gratings, at least one of which is movable.

Figure 5A:
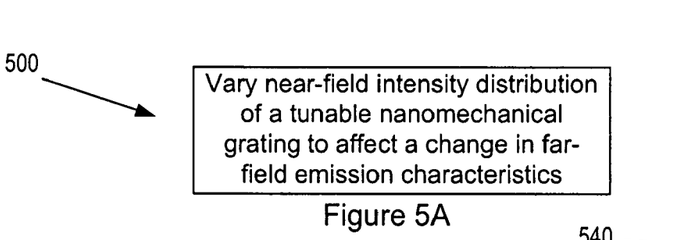
FIGS. 5A through 5D depict method 500, suitable for controlling the zeroth-order mode intensity of an optical signal, or sensing a change to an environmental factor by monitoring the intensity of the zeroth-order mode of an optical signal.
Figure 5B:
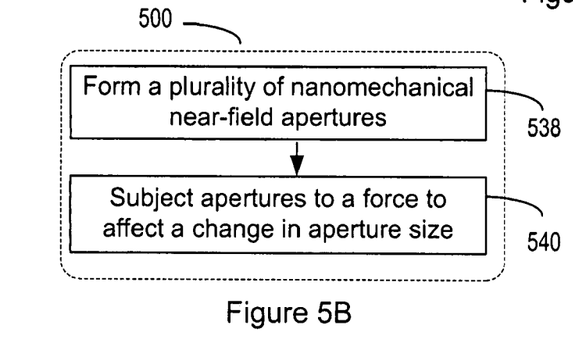

FIG. 5A depicts method 500, for altering the far-field emission characteristics of a tunable grating, such as grating 102, by perturbing the grating's near-field intensity distribution. FIG. 5B depicts an embodiment of method 500. In the embodiment depicted in FIG. 5B, method 500 includes operations 538 and 540. Operation 538 recites forming a plurality of nanomechanical near-field apertures (e.g., apertures 324, etc.). For the purposes of this specification, "near-field apertures" are defined as apertures that have an aperture width (as shown in FIGS. 3A and 3B) less than the operating wavelength of the grating.

In operation 540, the apertures are subjected to a force that causes an aperture dimension to change. Such a change in aperture dimension includes a change in aperture width, aperture depth, or both aperture width and aperture depth. Operation 540 can comprise either a pro-active application of force (i.e., a force that is applied to cause a change in aperture width) or a reactive force (i.e., a force imparted due to a change in an environmental factor, such as a temperature change, etc.).

Figure 5C:
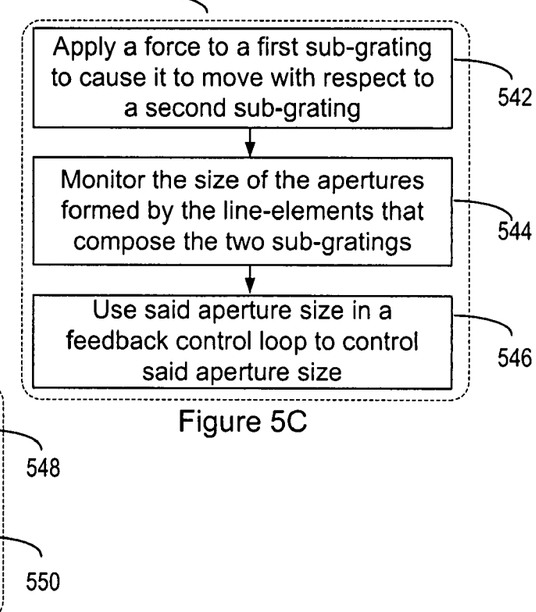

FIG. 5C depicts an embodiment of sub-operation 540 in which force is applied pro-actively, as for an active grating. In such embodiments, aperture dimension varies in response to a drive signal applied to an actuator that is coupled to grating 102. In sub-operation 542, a force is applied to a first sub-grating of a nanomechanical near-field grating, such as sub-grating 210 of grating 102, to cause it to move with respect to a second sub-grating, such as sub-grating 206 of grating 102. This force is applied using any one of a variety of suitable actuators, such as and without limitation, an electro-static lateral comb drive, electro-magnetic lateral actuator, thermal actuator, rack and pinion lateral actuator, piezoelectric actuator, or others as will occur to those skilled in the art in view of the present disclosure.

Sub-operations 544 and 546 are optional and are used in embodiments in which closed-loop feedback control is desired. In sub-operation 544, the dimensions of the apertures formed by the line-elements of the two sub-gratings, such as apertures 324 of grating 102, are monitored. The width and/or depth of the apertures can be monitored by monitoring the intensity of one of the diffraction modes of the output signal (such as signals 218 or 220), or by direct measurement of an aperture dimension through measurement of a parameter, such as and without limitation, capacitance, inductance, tunneling current, piezo-resistivity, or others as will occur to those skilled in the art in view of the present disclosure. In sub-operation 546, the aperture size obtained in operation 544 is used in a feedback loop, familiar to those skilled in the art, to control the aperture size. Used without sub-operations 544 and 546, operation 542 results in open-loop control of aperture size.

Figure 5D:
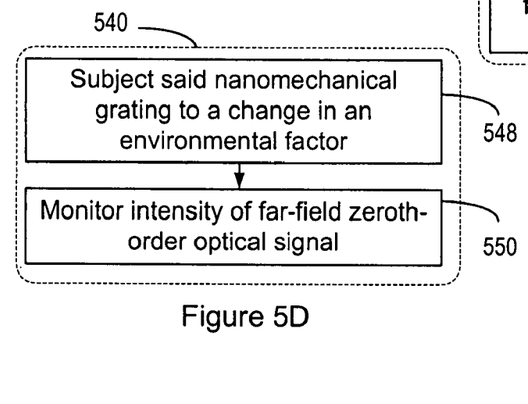

FIG. 5E depicts an embodiment of sub-operation 540 in which force is not applied pro-actively, as for a passive grating. In such embodiments, an aperture dimension varies in response to a change in an environmental factor. Sub-operation 548 describes subjecting a nanomechanical grating, such as grating 102, to a force initiated by a change in an environmental factor. Sub-operation 550 describes monitoring the intensity of the far-field emission pattern of the grating. Sub-operation 550 enables use of grating 102 as a sensor in either an analog fashion, wherein the relative amount of force is quantified, or digital fashion, wherein the presence of an environmentally-induced force is detected. Environmentally-induced forces include, but are not limited to, acceleration, shock, vibration, temperature change, incident radiation, chemical concentration, or others as will occur to those skilled in the art in view of the present disclosure.

Figure 6:
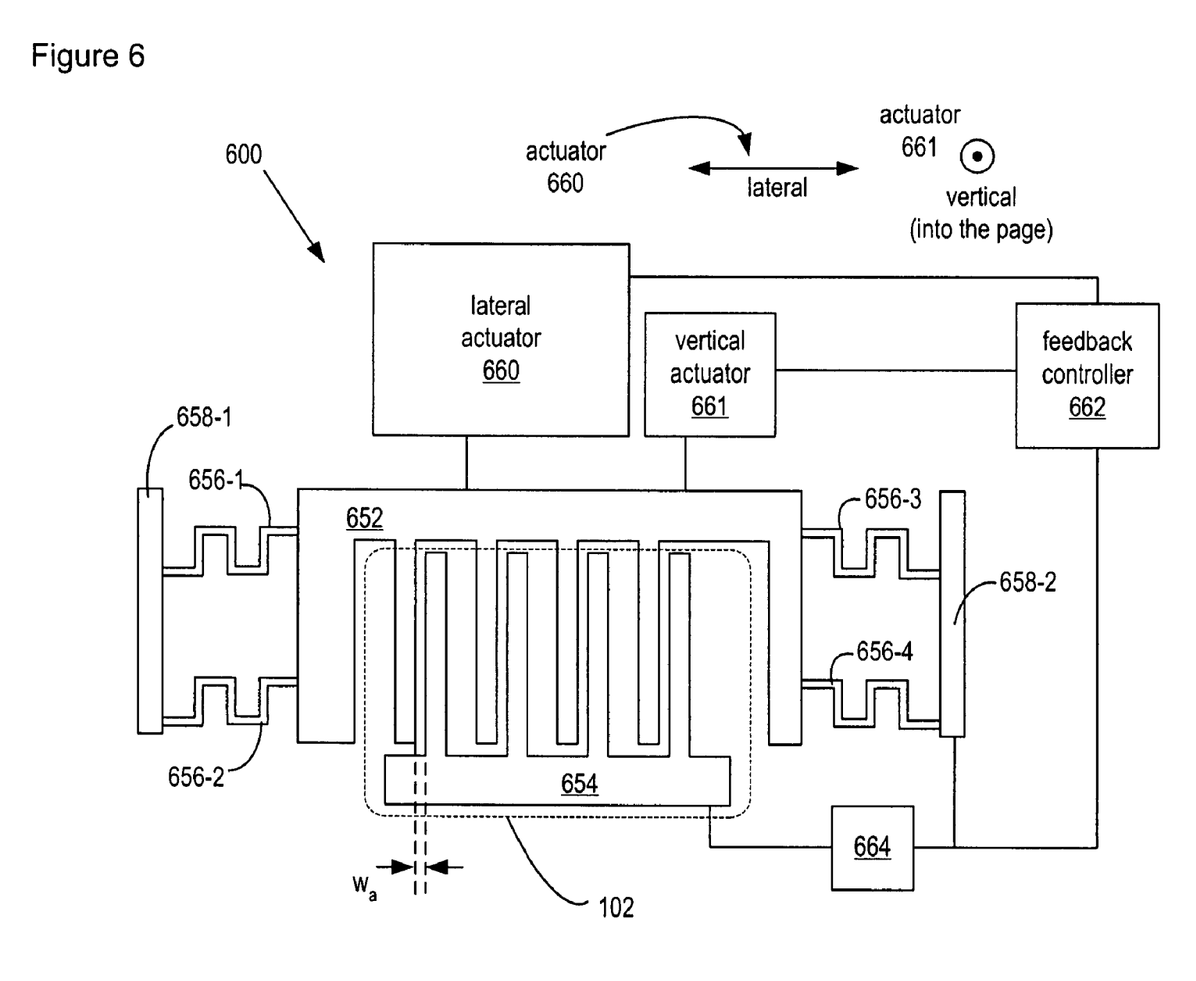
FIG. 6 depicts a top view of a tunable nanomechanical near-field grating implemented as an active grating in accordance with the illustrative embodiment.

FIG. 6 depicts a top view of a tunable nanomechanical near-field grating implemented as active grating 600 in accordance with the illustrative embodiment. Device 600 comprises grating 102, which comprises sub-gratings 652 and 654. Sub-gratings 652 and 654 each include a plurality of rigidly-coupled nanomechanical line-elements. Sub-grating 652 is suspended above sub-grating 654 by means of springs 656-1 and 656-2, which are connected to anchor 658-1, and springs 656-3 and 656-4, which are connected to anchor 658-2. The line-elements of sub-gratings 652 lie within the near field of the line-elements of sub-grating 654.

Sub-grating 652, lateral actuator 660, and vertical actuator 661 are coupled. Lateral actuator 660 enables a change of the lateral spacing between the line-elements of sub-grating 652 and the line-elements of sub-grating 654. Vertical actuator 661 enables a change of the vertical spacing between the line-elements of sub-grating 652 and the line-elements of sub-grating 654. A change to the spacing between the two sets of line-elements enables results in a change of the near-field intensity distribution of grating 102 and a resultant change of the far-field optical behavior of the grating 102.

The movement of lateral actuator 660 is controlled by feed-back controller 662, which acts to reduce the difference between a control signal that corresponds to the desired position of sub-grating 652 and the signal received from capacitance sensor 664 which monitors the aperture width, $w_a$.

Figure 7:
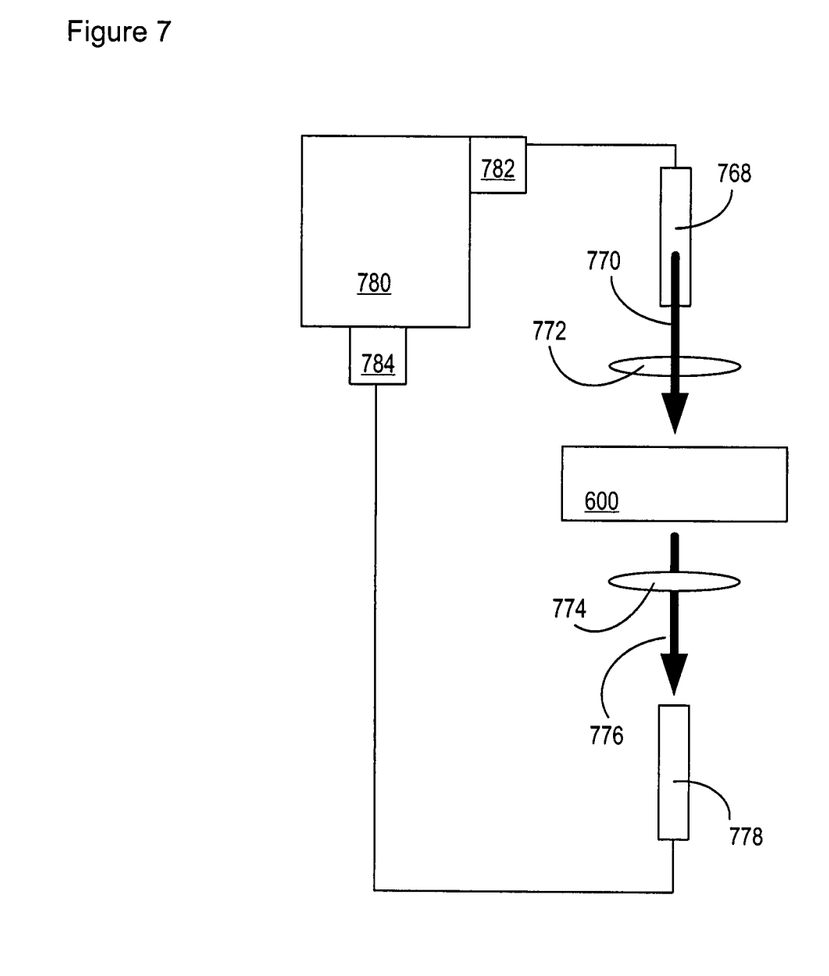
FIG. 7 depicts an optical communications network that incorporates an active grating, in accordance with the illustrative embodiment.

FIG. 7 depicts an optical communications network that incorporates active grating 600, in accordance with the illustrative embodiment. Input signal 770 is emitted from input optical fiber 768, which is connected to transmitter 782 of optical communications network 780. Input signal 770 propagates through input optical element 772 and is directed toward active grating 600.

As described in conjunction with FIG. 6, the position of sub-grating 652 relative to sub-grating 654 is controlled to alter the near-field intensity distribution of grating 102 and, thus, alter the far-field pattern of output signal 776 to achieve the desired output-signal characteristics of output signal 776. At least a portion of output signal 776 is captured by output optical element 774. The output optical element also directs at least a portion of output signal 776 into output optical fiber 778, which is connected to receiver 784 of optical communications network 780. In other embodiments, optical fibers 768 and 778 could be planar waveguides, or any other optical waveguide suitable for carrying input signal 770 and output signal 778.

In an optical communications network application, active grating 600 can be used to provide or enable a variety of functions such as optical modulation, signal attenuation, on-off switching, wavelength equalization, tunable wavelength channel blocking, wavelength adding or dropping, tunable spectrometry, wavelength selection, or channel monitoring.

Figure 8:
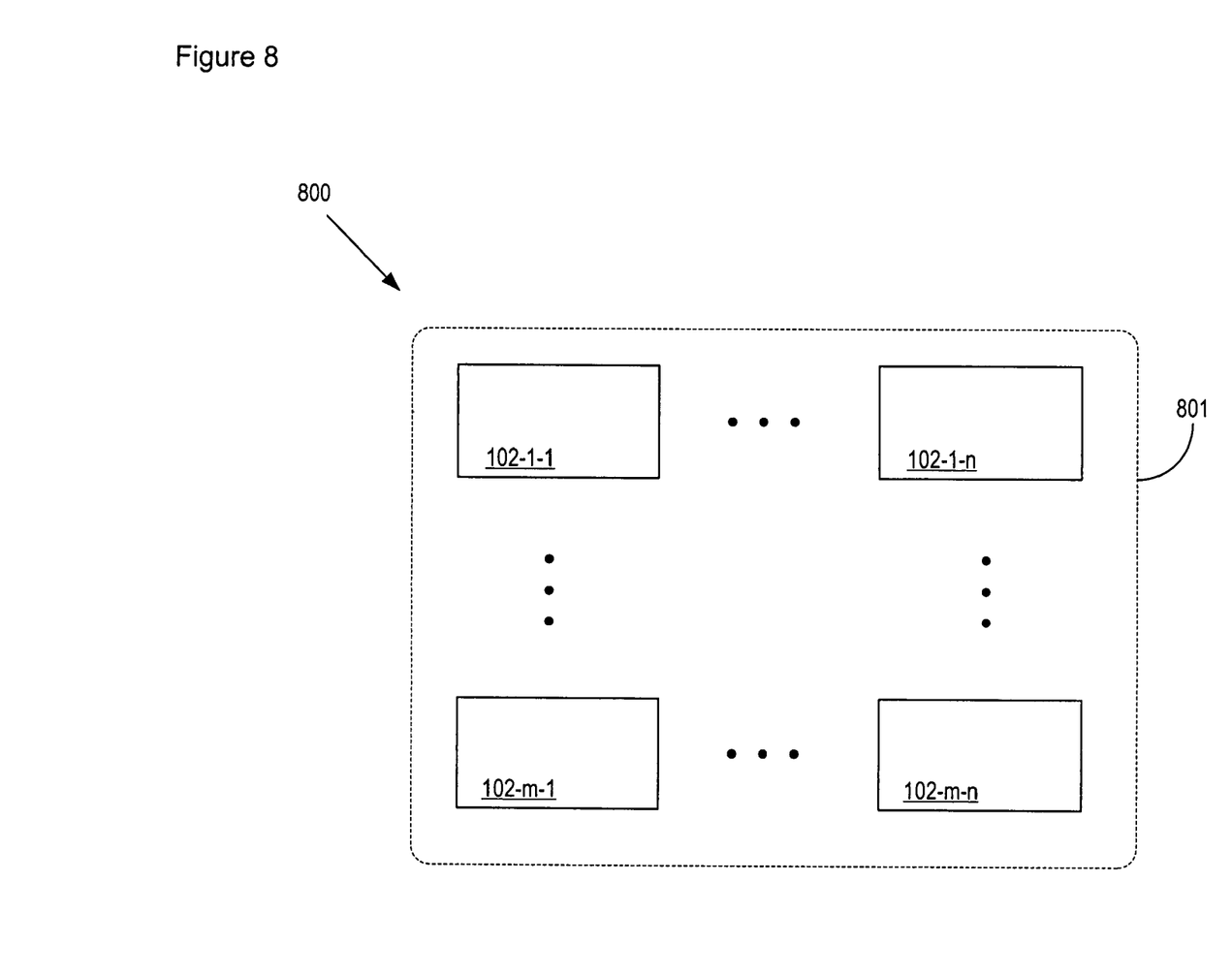
FIG. 8 depicts a top view of a two-dimensional array of tunable nanomechanical near-field gratings in accordance with the illustrative embodiment of the present invention.

FIG. 8 depicts a top view of a two-dimensional array of tunable nanomechanical near-field gratings in accordance with the illustrative embodiment of the present invention. Array 801 comprises tunable nanomechanical near-field gratings 102-1-1 through 102-$m$-$n$. The gratings can be active gratings (such as active grating 600), passive gratings, or any combination of active and passive gratings. In some embodiments, array 801 includes gratings that have the same operating wavelength. In some other embodiments. In yet some further embodiments, each grating has a unique operating wavelength.

Figure 9:
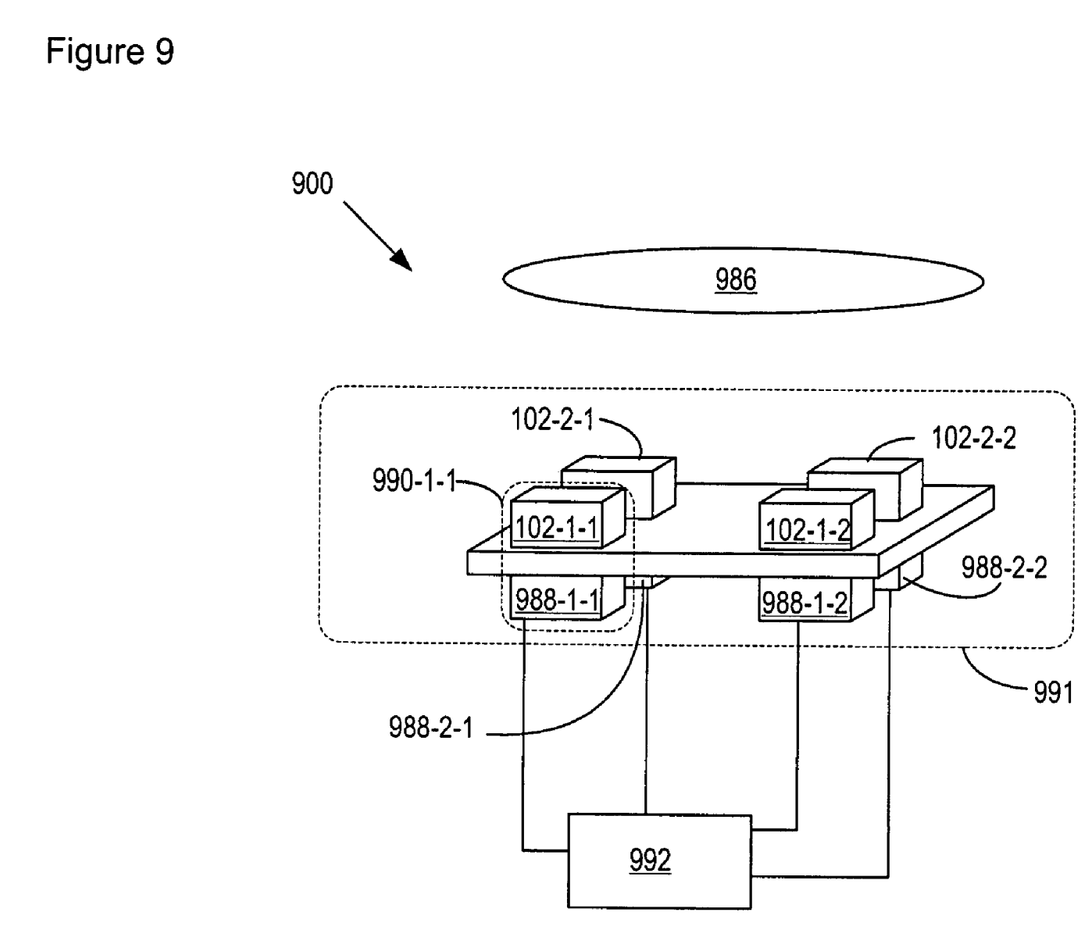
FIG. 9 depicts a perspective view of an imaging system that incorporates a two-dimensional array of tunable nanomechanical near-field gratings in accordance with the illustrative embodiment of the present invention.

FIG. 9 depicts a perspective view of an imaging system that incorporates array 801, which is implemented as a tunable focal plane array comprising a plurality of pixels, wherein each pixel contains a tunable nanomechanical near-field grating. Imaging system 900 comprises imaging system 986, which conditions and directs light from a scene onto focal plane array 991. Focal plane array 991 comprises array of pixels 900-$m$-$n$, wherein each pixel comprises a tunable nanomechanical near-field grating and an optical detector. For example, pixel 990-1-1 comprises grating 102-1-1 and optical detector 988-1-1.

Gratings 102-1-1 through 102-2-2 modulate the intensity of the zeroth-order light that is transmitted to their corresponding optical detectors 988-1-1 through 998-2-2 (collectively, optical detectors 998). Optical detectors 998 are electrically connected to image processing electronics 992, which performs signal conditioning, digital signal processing, etc. In this manner, an imaging system with active wavelength filtering is developed. Other applications for the embodiment presented in FIG. 6 include, but are not limited to, a spectrographic imager and a wavelength-selective camera.

Although FIG. 9 depicts an embodiment wherein two-dimensional focal plane array 991 contains only pixels having a single grating and a single optical detector, alternative embodiments include those wherein focal plane array 991 is a linear array. Alternative embodiments also include those wherein focal plane array 991 comprises pixels having:
 a plurality of gratings and a single detector;
 a single grating and a plurality of detectors; or
 a plurality of gratings and a plurality of detectors.

In some other embodiments, detectors 998 comprise:
 detectors that are all sensitive to a single wavelength;
 detectors that are each sensitive to different wavelengths;
 groups of detectors, wherein each group is sensitive to different wavelengths; or
 any combination of such detectors.

In yet additional embodiments, focal plane array 991 comprises:
 gratings that all have a single operating wavelength;
 gratings that each have different operating wavelengths;
 groups of gratings, wherein each group has a different operating wavelength; or
 any combination of such gratings.

Figure 10:
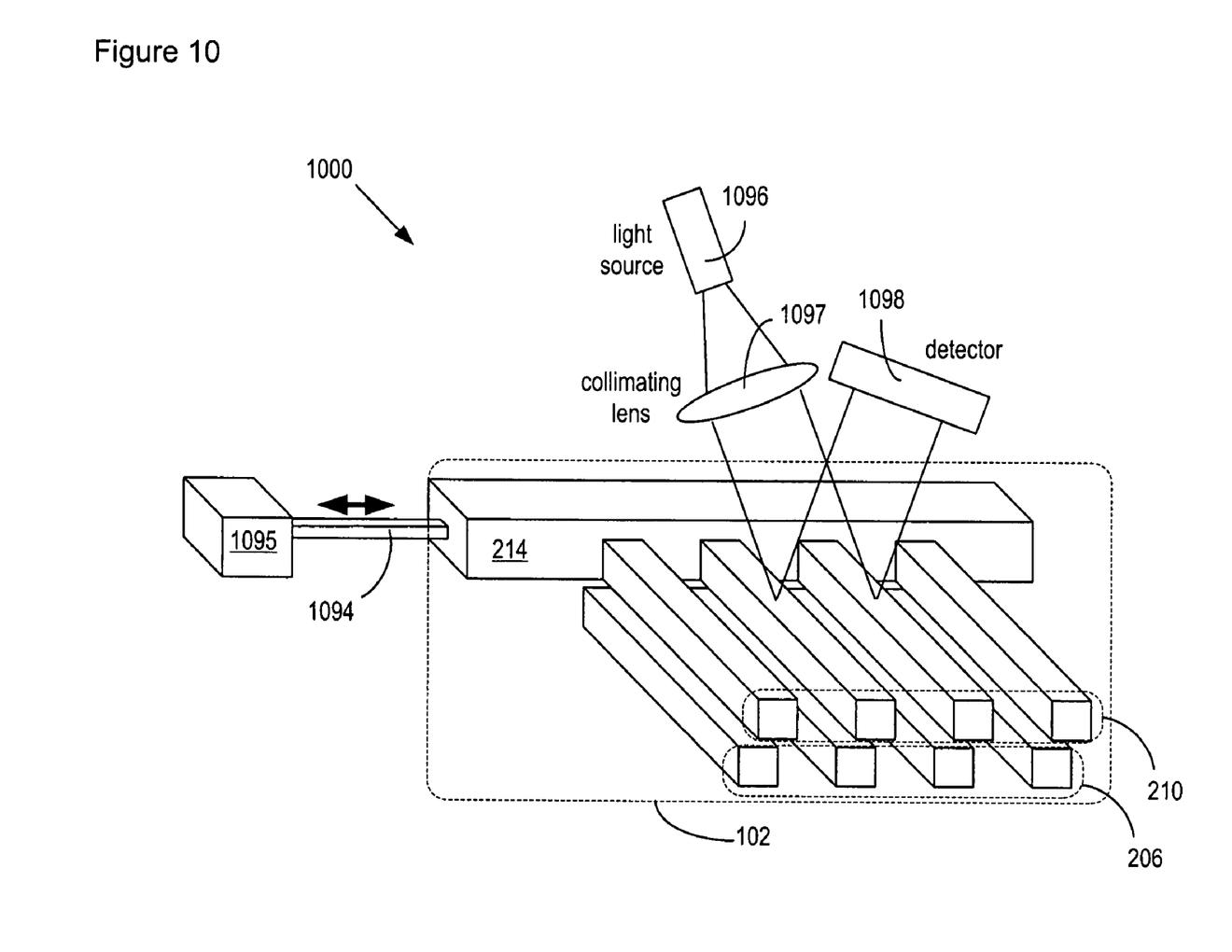
FIG. 10 depicts a perspective view of passive grating in accordance with an illustrative embodiment of the present invention.

FIG. 10 depicts a perspective view of passive grating in accordance with an illustrative embodiment of the present invention. Sensor-type grating 1000 comprises grating 102, which comprises sub-grating 206 and sub-grating 210. Sub-grating 210 is coupled to tether 1094 via beam 214. Tether 1094 is coupled to anchor 1095 and provides support for sub-grating 210. Furthermore, tether 1094 supports transduction of a change in an environmental factor into a force sufficient to change the position of sub-grating 210 with respect to sub-grating 206. Although FIG. 10 depicts a tether that combines the functions of support and force transducer, in some other embodiments, these functions are not combined but provided by different elements that are coupled to one of sub-gratings 206 and 210.

Passive grating 1000 further comprises light source 1096, which provides light at the operating wavelength of grating 102. Light from light source 1096 is collimated and directed at grating 102 by optical element 1097. Detector 1098, which is sensitive to the operating wavelength, collects a portion of the light emerging from grating 102 and provides a signal corresponding to the amount of light collected. Alternative embodiments include those wherein optical element 1097 is not included, and embodiments wherein detector 1098 captures the transmissive output signal of grating 102 instead of the reflective output signal as shown in FIG. 10.

It is to be understood that the above-described embodiments are merely illustrative of the present invention and that many variations of the above-described embodiments can be devised by those skilled in the art without departing from the scope of the invention. For example, in this Specification, numerous specific details are provided in order provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments.

It is therefore intended that such variations be included within the scope of the following claims and their equivalents.

What is claimed is:

1. An apparatus comprising:
a first nanomechanical near-field grating, said first nanomechanical near-field grating comprising a linear arrangement of at least a plurality of first apertures, wherein:
said first apertures have a substantially uniform size;
said size is less than or equal to a first operating wavelength; and
said size is uniformly variable;
a first sub-grating comprising a plurality of regularly-spaced first line-elements, wherein said regular-spacing defines a first period aligned with a first axis, and wherein said first line-elements lie substantially in a first plane, and further wherein said first line-elements have a width and thickness less than or equal to said first operating wavelength;
a second sub-grating comprising a plurality of regularly-spaced unit-cells, wherein said regular-spacing defines a second period aligned with a second axis, and wherein each said unit-cell comprises at least one second line-element, and wherein said second line-elements lie substantially in a second plane which is vertically separated from the first plane, and further wherein said second line-elements have a width and thickness less than or equal to said first operating wavelength;
at least one support for supporting one of said first sub-grating and said second sub-grating, wherein one of either said first sub-grating is movable along said first axis and said second sub-grating is movable along said second axis; and
wherein said first aria and said second axis are in at least partially overlapping relation to one another; and
wherein at least one of said first period and said second period have a value larger than said operating wavelength.

2. The apparatus of claim 1 wherein each of said first apertures is defined by one of said first line-elements and one of said second line-elements.

3. The apparatus of claim 1 wherein said first period and said second period have different values.

4. The apparatus of claim 1 wherein one of said first period and said second period have a value less than or equal to said operating wavelength.

5. The apparatus of claim 2 wherein said first line-elements and said second line-elements are separated by a vertical distance less than or equal to said first operating wavelength.

6. The apparatus of claim 5 further comprising a first vertical actuator for varying said vertical distance.

7. The apparatus of claim 1 further comprising a second nanomechanical near-field grating, wherein said first nanomechanical near-field grating and second nanomechanical near-field grating define an array.

8. The apparatus of claim 7, wherein said first nanomechanical near-field grating has said first operating wavelength and said second nanomechanical near-field grating has a second operating wavelength.

9. The apparatus of claim 1 wherein said size varies in response to a change in an environmental factor.

10. The apparatus of claim 1 further comprising a means for controlling said size.

11. The apparatus of claim 1 farther comprising:
an input signal;
a first optical element;
an output signal, wherein said output signal comprises at least a portion of said input signal after said input signal has interacted with said first nanomechanical near-field grating; and
a fixture for aligning said first optical element, and said first nanomechanical near-field grating, such that said input signal is directed at said first nanomechanical near-field grating.

12. The apparatus of claim 11 wherein said input signal comprises a plurality of signal wavelengths, such that each of said signal wavelengths is greater than or equal to said first operating wavelength, and wherein said output signal contains fewer said signal wavelengths than said input signal.

13. The apparatus of claim 12 wherein said output signal contains one said signal wavelength.

14. The apparatus of claim 11 wherein the intensity of said output signal is less than the intensity of said input signal.

15. The apparatus of claim 11 wherein the intensity of said output signal is substantially zero.

16. The apparatus of claim 11 further comprising:
an optical waveguide network;
a transmitter, said transmitter being capable of transmitting signals on at least one wavelength;
a receiver, said receiver being capable of receiving signals on at least one wavelength;
an optical waveguide interconnection for interconnecting said optical waveguide network to at least one of said first optical element and a second optical element.

17. The apparatus of claim 11 further comprising:
a second optical element; and
a fixture for aligning said second optical element and said first nanomechanical near-field grating, such that said output signal is directed at said second optical element.

18. The apparatus of claim 7 further comprising:
at least one optical imaging element; and
a detector array, wherein said detector array contains at least one detector aligned with each of said first nonomechanical near-field grating and second nanomechanical near-field rating.

19. The apparatus of claim 18 further comprising image processing electronics.

20. An apparatus comprising:
a tunable nanomechanical near-field grating comprising:
a first nanomechanical sub-grating, wherein said first nanomechanical sub-grating includes a plurality of first line-elements, and wherein said first line-elements have width and thickness less than an operating wavelength;
a second nanomechanical sub-grating, wherein said second nanomechanical sub-grating includes a plurality of second line-elements, and said second line-elements have width end thickness less than said operating wavelength;
at least one support for aligning said second nanomnechanical sub-grating and said first nanomechanical sub-grating such that said second line-elements are within the near-field region of said first line elements and vertically separated from said first line elements, and with the first and second line-elements providing a plurality of apertures of a substantially uniform size which is less than or equal to the operating wavelength; and
wherein said support enables said second line-elements to substantially uniformly move within said near-field regions and wherein at least one of the first and second nanomechanical sub-gratings has a period greater than the operating wavelength.

21. The apparatus of claim 20 wherein said second line-elements move in response to a change in an environmental factor.

22. The apparatus of claim 20 further comprising a means for controlling the movement of said second line-elements.

23. The apparatus of claim 20 further comprising a means for sensing said position.

24. An apparatus comprising:
a tunable nanomechanical near-field grating further comprising:
a first nanomechanical sub-grating, wherein said first nanomechanical sub-grating includes a plurality of first line-elements, and wherein said first line-elements have width and thickness less than an operating wavelength;
a second nanomechanical sub-grating, wherein said second nanomechanical sub-grating includes a plurality of second line-elements, and said second line-elements have width and thickness less than said operating wavelength;
a first support located on one side of said second nanomechanical sub-grating, and a second support located on an opposite side of said second nanomechanical sub-grating, with each support further comprising a spring connected to suspend said second nanomechanical sub-grating above said first nanomechanical sub-grating without contact therebetween such that said second line-elements are within the near-field region of said first line elements and said second line-elements are moveable within said near-field regions to provide a plurality of apertures all having the same size which is less than or equal to the operating wavelength.

25. The apparatus of claim 24 wherein a period of at least one of said plurality of first line-elements and said plurality of second line-elements is less than or equal to said operating wavelength.

26. The apparatus of claim 24 wherein each spring comprises a folded spring.

27. The apparatus of claim 24 wherein each spring is deformable substantially in the plane of the second nanomechanical sub-grating to permit a lateral movement of the second nanomechanical sub-grating relative to the first nanomechanical sub-grating.

28. The apparatus of claim 24 further comprising a means for controlling the movement of said second line-elements.

* * * * *